United States Patent
Kaufmann

(10) Patent No.: US 10,866,423 B2
(45) Date of Patent: Dec. 15, 2020

(54) METHOD AND DEVICE FOR OPERATING A DISPLAY SYSTEM COMPRISING A HEAD-MOUNTED DISPLAY

(71) Applicant: Bayerische Motoren Werke Aktiengesellschaft, Munich (DE)

(72) Inventor: Matthias Kaufmann, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/386,457

(22) Filed: Apr. 17, 2019

(65) Prior Publication Data

US 2019/0243143 A1  Aug. 8, 2019

Related U.S. Application Data

(63) Continuation of application No. PCT/EP2017/072707, filed on Sep. 11, 2017.

(30) Foreign Application Priority Data

Oct. 26, 2016  (DE) .......... 10 2016 221 123

(51) Int. Cl.
*G02B 27/01* (2006.01)
*G06F 3/03* (2006.01)
(Continued)

(52) U.S. Cl.
CPC .......... *G02B 27/0172* (2013.01); *B60K 35/00* (2013.01); *G02B 27/0093* (2013.01);
(Continued)

(58) Field of Classification Search
USPC ........................................... 345/8
See application file for complete search history.

(56) References Cited

U.S. PATENT DOCUMENTS 6,900,594 B1 * 5/2005 Reichert ............. B60Q 1/1423
250/214 AL
8,964,062 B1 * 2/2015 Neglur ................ H04N 5/2353
348/230.1
(Continued)

FOREIGN PATENT DOCUMENTS

CN  103024279 A  4/2013
CN  203055143 U  7/2013
(Continued)

OTHER PUBLICATIONS

International Search Report (PCT/ISA/210) issued in PCT Application No. PCT/EP2017/072707 dated Feb. 9, 2018 with English translation (five pages).
(Continued)

*Primary Examiner* — Chineyere D Wills-Burns
(74) *Attorney, Agent, or Firm* — Crowell & Moring LLP

(57) ABSTRACT

A method operates a display system having a pair of data glasses in a motor vehicle. The method transmits brightness information, especially supplied by a driver assistance system, to the data glasses, and adapts, depending on the transmitted brightness information, an aperture opening and/or an exposure time of a data glasses camera which is used to recognize a position and orientation of the data glasses.

15 Claims, 2 Drawing Sheets

(51) Int. Cl.
| | |
|---|---|
| *B60K 35/00* | (2006.01) |
| *G03B 7/097* | (2006.01) |
| *G02B 27/00* | (2006.01) |
| *G06F 3/01* | (2006.01) |
| *G06F 1/16* | (2006.01) |
| *G06K 9/00* | (2006.01) |
| *H04N 5/235* | (2006.01) |
| *G06T 7/73* | (2017.01) |

(52) U.S. Cl.
CPC ............ *G02B 27/017* (2013.01); *G03B 7/097* (2013.01); *G06F 1/163* (2013.01); *G06F 3/012* (2013.01); *G06F 3/0304* (2013.01); *G06K 9/00791* (2013.01); *G06T 7/73* (2017.01); *H04N 5/2353* (2013.01); *B60K 2370/347* (2019.05); *G02B 2027/014* (2013.01); *G02B 2027/0118* (2013.01); *G02B 2027/0138* (2013.01); *G02B 2027/0178* (2013.01); *G02B 2027/0187* (2013.01); *G06T 2207/30244* (2013.01); *G06T 2207/30268* (2013.01)

(56) References Cited

U.S. PATENT DOCUMENTS

| | | | |
|---|---|---|---|
| 9,454,154 B1 | 9/2016 | Safarik | |
| 10,162,409 B2 | 12/2018 | Knebel et al. | |
| 10,198,868 B2 | 2/2019 | Yamaguchi | |
| 2008/0062291 A1 | 3/2008 | Sako et al. | |
| 2011/0074956 A1* | 3/2011 | Faber | G02B 27/01 348/148 |
| 2012/0212499 A1* | 8/2012 | Haddick | G06F 3/017 345/589 |
| 2014/0009639 A1 | 1/2014 | Lee | |
| 2014/0333826 A1 | 11/2014 | Lo | |
| 2015/0002808 A1* | 1/2015 | Rizzo, III | G02C 11/10 351/158 |
| 2015/0061995 A1* | 3/2015 | Gustafsson | A61B 3/113 345/156 |
| 2015/0062469 A1* | 3/2015 | Fleury | G02C 7/10 349/14 |
| 2015/0350510 A1* | 12/2015 | Han | H04N 5/2354 348/229.1 |
| 2016/0041612 A1* | 2/2016 | Spiessl | G02B 27/0172 345/156 |
| 2016/0214467 A1* | 7/2016 | El Idrissi | B60J 3/04 |
| 2016/0370588 A1* | 12/2016 | Parker | H04N 13/307 |
| 2017/0178359 A1* | 6/2017 | Spiessl | G06T 7/73 |
| 2017/0332009 A1* | 11/2017 | Zhang | G06F 3/0482 |

FOREIGN PATENT DOCUMENTS

| | | |
|---|---|---|
| CN | 103546683 A | 1/2014 |
| CN | 104144292 A | 11/2014 |
| CN | 104333750 A | 2/2015 |
| CN | 105651382 A | 6/2016 |
| CN | 105722708 A | 6/2016 |
| CN | 105960193 A | 9/2016 |
| DE | 10 2014 206 623 A1 | 10/2015 |
| DE | 10 2014 213 021 A1 | 1/2016 |
| DE | 10 2014 222 355 A1 | 5/2016 |
| DE | 10 2016 006 242 A1 | 12/2016 |
| EP | 2 752 710 A1 | 7/2014 |
| WO | WO-2015155029 A1 * | 10/2015 ............ G02B 27/017 |

OTHER PUBLICATIONS

German-language Written Opinion (PCT/ISA/237) issued in PCT Application No. PCT/EP2017/072707 dated Feb. 9, 2018 (six pages).
German-language Search Report issued in counterpart German Application No. 10 2016 221 123.4 dated Jul. 17, 2017 with partial English translation (11 pages).
Chinese-language Office Action issued in Chinese Application No. 201780058802.X dated Sep. 9, 2020 with English translation (23 pages).

* cited by examiner

METHOD AND DEVICE FOR OPERATING A DISPLAY SYSTEM COMPRISING A HEAD-MOUNTED DISPLAY

CROSS REFERENCE TO RELATED APPLICATIONS

This application is a continuation of PCT International Application No. PCT/EP2017/072707, filed Sep. 11, 2017, which claims priority under 35 U.S.C. § 119 from German Patent Application No. 10 2016 221 123.4, filed Oct. 26, 2016, the entire disclosures of which are herein expressly incorporated by reference.

BACKGROUND AND SUMMARY OF THE INVENTION

The invention relates to display systems for data glasses, in particular for use in a motor vehicle.

Data glasses, also called head-mounted displays, which can display an image on one or two display surfaces in the field of vision of the person wearing the data glasses with the aid of a display device are known. The display surfaces correspond to reflection surfaces which direct images into the eye of the person wearing the data glasses. The sight openings of the data glasses are transparent, with the result that the real environment can be perceived in a conventional manner through the data glasses. The display surfaces are in the sight openings and can be semi-transparent, with the result that an item of information to be displayed, for example text, symbols, graphics, video displays and the like, can be displayed in a manner superimposed on the perception of the environment. In addition, data glasses which comprise a non-transparent display are also known.

The information is generally presented to the person wearing the data glasses in a contact-analog manner, that is to say is presented in such a manner that the information is superimposed on a particular object in the real environment or is oriented with respect to said object or the information to be displayed is displayed in a particular orientation of the data glasses or the person wearing the latter. It is also desirable to present the information in such a manner that it appears correctly in terms of perspective with respect to the object in the real environment, that is to say the illusion is created of the object in the real environment actually being supplemented with the additional feature of the visual information.

In order to accordingly display the information in a contact-analog manner on the display surfaces of the data glasses, it is necessary to know the position of the object in the environment and the pose of the data glasses, that is to say the 3-D position and the 3-D orientation of the data glasses, with respect to the object. In order to determine the pose of the data glasses, a pose detection unit can be provided in the data glasses. The pose detection unit generally has a camera and a computing device, for example in the form of a microprocessor. Images of the environment of the person wearing the data glasses which are recorded with the aid of the camera can determine the pose of the data glasses in the vehicle interior on the basis of stored images or structures of the vehicle interior. This process is also called tracking.

DE 10 2014 206 623 A1 discloses a device for determining the pose of data glasses which comprises a display and a camera. The device is designed to create photographs of the environment of the data glasses with the aid of the camera, to detect the image of a stored and predefined region of the environment in the photographs from the camera, to detect a feature in the detected image of the region and to determine the pose of the data glasses taking into account the particular feature in the photographs.

The camera used to detect the pose generally has an adjustable aperture which is adapted to a brightness. However, if different brightnesses prevail in the environment of the data glasses, the vehicle interior cannot be perceived under certain circumstances. For example, in the case of a dark vehicle interior and a bright vehicle environment, the aperture may narrow and may adjust to the brightness of the vehicle environment, with the result that structures of the vehicle interior can no longer be distinguished in a detectable manner by the camera.

However, the image information relating to the vehicle environment is irrelevant to the tracking, that is to say the pose detection with the aid of a camera in the data glasses, since only image information relating to the interior of the vehicle is used to detect the pose. Therefore, the aperture of the camera required for the tracking on the data glasses must accordingly be adapted to the brightness of the environment. However, in the case of difficult or changing light conditions with a bright environment and a dark vehicle interior in particular, this results in the aperture being incorrectly adjusted and therefore making tracking difficult.

The object of the present invention is therefore to provide a display system having data glasses in which the tracking, that is to say the camera-based pose detection of the data glasses, can be carried out in a more reliable manner and even in difficult light conditions.

This object is achieved by a method for operating a display system having data glasses and by the data glasses used in the method in accordance with the claimed invention.

A first aspect provides a method for operating a display system having data glasses in a motor vehicle. The method includes the steps of: transmitting an item of brightness information to data glasses, in particular from a driver assistance system; and adapting an aperture and/or an exposure time of a data glasses camera, which is used to detect a pose of the data glasses, on the basis of the transmitted brightness information.

One aspect of the above method involves transmitting brightness information from a driver assistance system in the motor vehicle to the data glasses, with the result that brightness information captured outside the data glasses is available in the data glasses.

This makes it possible, in addition to the brightness information captured with the aid of the data glasses, in particular using a brightness sensor or the camera of the data glasses, to obtain a further item of brightness information which makes it possible to infer the brightness state in the vehicle interior.

The aperture and/or the exposure time of the camera, which is used to detect the pose of the data glasses, can consequently be adjusted in such a manner that the vehicle interior can be captured by the camera even in unfavorable light conditions, for example in the case of a dark vehicle interior and a very bright vehicle environment. Thus, the poses of the data glasses can still be reliably determined. In particular, the aperture can be adapted in such a manner that structures and features of the vehicle interior are imaged with sufficient image sharpness, and the exposure time can be adjusted in such a manner that the imaged structures and features are presented in a suitable brightness range.

Overall, this makes it possible for the pose of the data glasses to be detected in a more stable manner and to result in less incorrect displays of information in the data glasses, in particular in the case of unfavorable or quickly changing lighting situations. As a result of the improved consideration of the separately determined brightnesses inside and/or outside the motor vehicle, the error rate when detecting the pose can be reduced and the information displayed in the data glasses can therefore be displayed more smoothly.

Furthermore, the transmitted brightness information can correspond to an item of brightness information for the vehicle interior which is captured by an interior brightness sensor. This is a possible way of directly capturing the light conditions in the vehicle interior.

Alternatively, the transmitted brightness information can be determined from a camera image from a camera in the motor vehicle which captures part of the vehicle environment.

Alternatively, the transmitted brightness information can be determined from an ambient brightness sensor.

Provision may be made for the aperture and the exposure time of the data glasses camera, which is used to detect the pose of the data glasses, to be determined on the basis of the transmitted brightness information and an item of brightness information captured with the aid of the data glasses.

According to one embodiment, the brightness information captured with the aid of the data glasses can be determined from a camera image from the data glasses camera or can be determined with the aid of a brightness sensor on the data glasses.

Another aspect provides a pair of data glasses in a motor vehicle, comprising: a data glasses camera with an adjustable aperture and/or exposure time; and a pose detection unit which is configured to: receive one or more items of brightness information, in particular from a driver assistance system, and adapt an aperture and/or an exposure time of a data glasses camera, which is used to detect a pose of the data glasses, on the basis of the transmitted brightness information.

Furthermore, the above data glasses may be provided with a data glasses brightness sensor for providing one of the items of brightness information.

Another aspect provides a display system having the above data glasses and having a driver assistance system which is designed to provide the data glasses with one or more items of brightness information.

Furthermore, the driver assistance system can include an ambient brightness sensor and/or an interior brightness sensor for providing a respective item of brightness information.

In particular, the ambient brightness sensor can be formed by a rain sensor or may be included in the latter.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
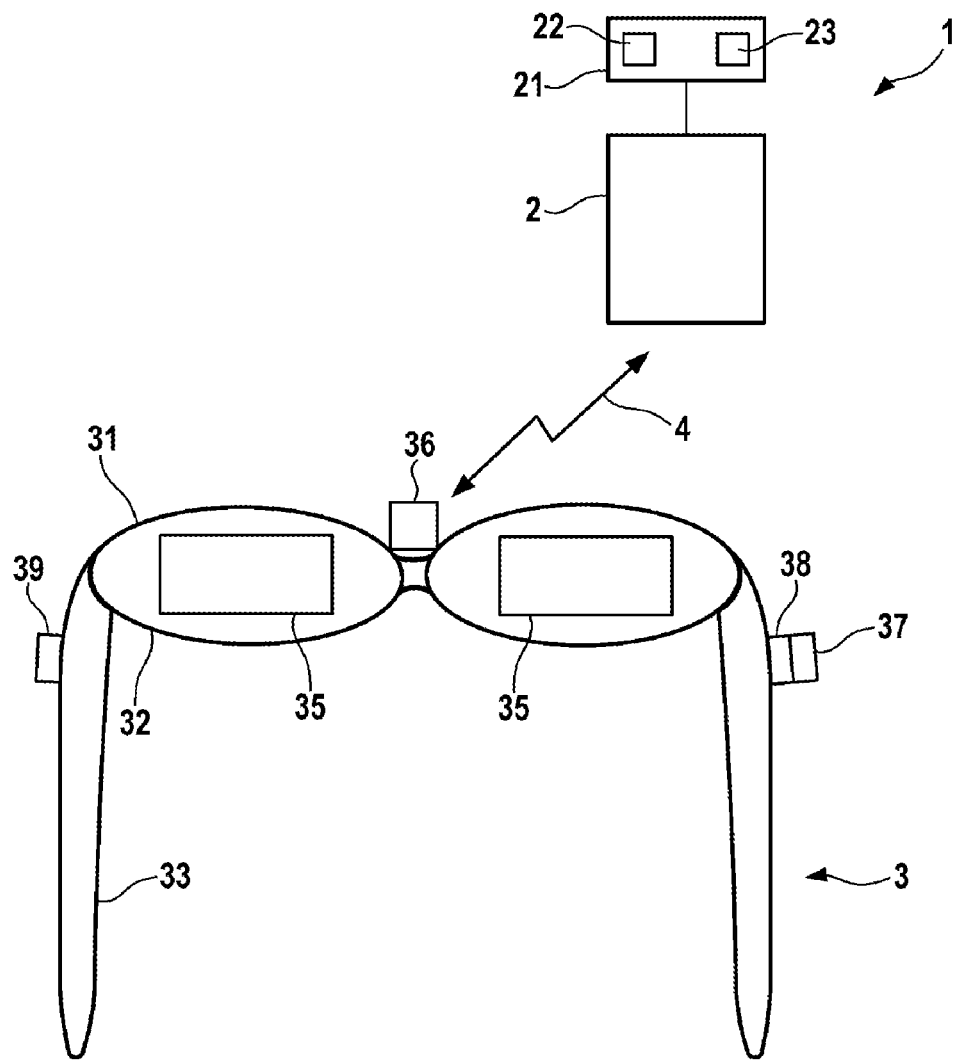
FIG. 1 is a schematic illustration of a display system having data glasses for use in a motor vehicle.

FIG. 1 schematically illustrates a display system 1, in particular for use in a motor vehicle. The display system 1 includes a driver assistance system 2 which has a communication connection 4 to data glasses 3. The communication connection 4 is in the form of a data transmission channel 4, for example in the form of a wireless communication connection or a wired communication connection. The communication connection 4 is able to transmit any type of data and information between the driver assistance system 2 and the data glasses 3, for example on the basis of packet-based data transmission.

The data glasses 3 have two transparent lenses 32 which are enclosed in a frame 31 in a manner known per se. The frame 31 is provided with earpieces 33, with the result that the data glasses 3 can be worn on the head of a user in a manner known per se.

The lenses 32 are also each provided with a transparent display surface 35 in which a display image can be displayed by way of a suitable device, for example a display device 36 arranged on the frame 31. The display device 36 may have a microprocessor or a comparable computing unit and a display unit, for example a projector or the like. The display unit can be designed to display an electronically generated display image on the display surface 35.

As a result of the transparent design of the display surface 35, the electronically generated image can be superimposed on the real environment which can be perceived through the display surface 35. An item of information, for example an item of text, a symbol, an item of video information, a graphics item, or the like, can be presented on one or both display surfaces 35 with aid of the display device 36.

Furthermore, the data glasses 3 can be provided with a pose detection unit 37 in order to determine a pose of the head in a vehicle interior. The pose of data glasses denotes here the spatial position of the data glasses in a vehicle-fixed coordinate system and their three-dimensional orientation. For this purpose, the pose detection unit 37 may have a suitable data glasses camera 38 which is directed approximately in the viewing direction of the person wearing the data glasses 3 and is used to detect the cockpit and distinctive points inside the cockpit and to determine the pose of the data glasses therefrom.

The data glasses 3 can be worn like a typical visual aid on the user's head, wherein the frame 31 of the data glasses 3 rests on the user's nose and the sidepieces rest on the side of the user's head. The viewing direction of the user in the direction straight ahead is then effected through the lenses 32, substantially through the transparent display surfaces 35, with the result that the user's viewing direction corresponds to the orientation of the data glasses 3 or can be derived therefrom.

The driver assistance system 2 is connected to at least one environment capture device 21 which can be used to perceive or identify objects in a vehicle environment. For example, such a device may have one or more cameras, one or more LIDAR sensors, a radar, an ultrasonic sensor and the like. If a plurality of cameras or sensors are provided, an overall image can be generated by combining individual images in order to obtain an item of all-round image information.

In particular, the cameras of the environment capture device 21 are used to optically capture the vehicle environment, and an item of brightness information can be determined from the vehicle environment. The brightness information can also be determined in a direction-dependent manner depending on which angle ranges are covered by the optical cameras.

Alternatively, an ambient brightness sensor 22 can be provided on the motor vehicle in order to determine an ambient brightness and to provide the ambient brightness information. A signal from an optical rain sensor can also be used for this purpose, for example.

Furthermore, the driver assistance system may have interior cameras in order to capture an item of brightness information from the vehicle interior. Alternatively or additionally, the brightness in the vehicle interior can be determined with the aid of an interior brightness sensor 23. Alternatively or additionally, the data glasses 3 may also be provided with a data glasses brightness sensor 39 in order to capture an undirected brightness of the vehicle interior at the position of the data glasses 3.

In order to detect the pose with the aid of a data glasses camera 38, it is necessary for the latter to be able to optically capture or detect the structures or features of the vehicle interior or of the cockpit. However, the quality of the optical image from the data glasses camera 38 and the ability to detect the structures and features decisively depends on the aperture of said camera and the selected exposure time. However, the aperture and the exposure time are usually determined by an item of glasses brightness information which results from an average brightness of the image recorded by the data glasses camera 38 or from a signal from a brightness sensor fitted to the data glasses. Depending on the ambient brightness differing from the brightness in the vehicle interior, the aperture of the data glasses camera 38 is therefore opened or closed too far and/or the exposure time is incorrectly selected. The result is that contours in the vehicle interior are not imaged with sufficient sharpness and are imaged in an overexposed or excessively dark manner. Hence, the details of the vehicle interior cannot be used to unambiguously detect the pose of the data glasses 3.

Figure 2:
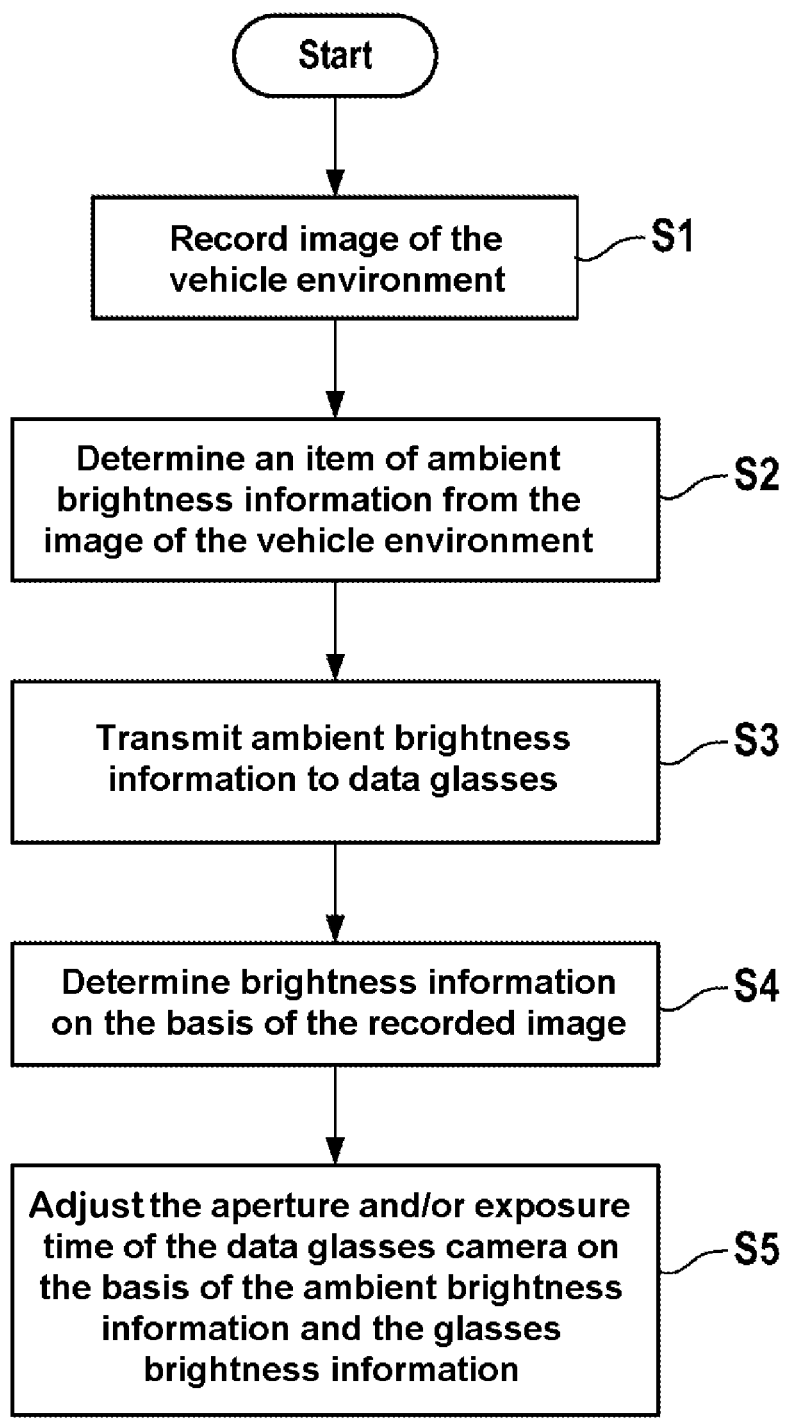
FIG. 2 is a flowchart for illustrating an exemplary method for operating the display system.

The flowchart in FIG. 2 now explains in more detail a method for operating the display system 1 which makes it possible to adjust the aperture in an optimized manner and thereby improve the detection of the pose.

In step S1, an image of the vehicle environment is recorded with the aid of the optical cameras of the environment capture device 21, and a corresponding item of ambient brightness information HU relating to the vehicle environment is provided from the image of the vehicle environment in step S2. The ambient brightness information HU may be, for example, an averaged brightness of regions of the image of the vehicle environment. In this description, the brightness information is understood as meaning brightness specifications which can be provided, in particular, by a physical variable representing brightness.

Alternatively, the ambient brightness can also be determined by the ambient brightness sensor 22 in order to provide the ambient brightness information HU. A signal from an optical rain sensor or a brightness sensor of an automatic lighting system can also be used for this purpose, for example.

The ambient brightness information HU obtained in this manner is transmitted to the data glasses 3 via the communication connection 4 in step S3.

In step S4, an item of glasses brightness information HB can be determined. The glasses brightness information can be determined from the image last recorded by the data glasses camera 38, for example as an average brightness. The glasses brightness information can also be captured by a data glasses brightness sensor 39.

In step S5, the data glasses 3 can select a corresponding aperture and exposure time setting of the data glasses camera 38 on the basis of the ambient brightness information HU and the glasses brightness information HB. The result is that a sufficient sharpness of detail of structures of the vehicle interior and a sufficient brightness range can be captured for the pose detection. In this case, the aperture can be adjusted in such a manner that, under certain circumstances, the vehicle environment cannot be detected by the data glasses camera 38 and only the image of the vehicle interior can be processed by the pattern recognition.

This makes it possible to already adapt the aperture and/or the exposure time of the data glasses camera 38, before the corresponding image is recorded, on the basis of the ambient brightness information and the glasses brightness information.

The aperture can be adapted on the basis of a determination of an item of true brightness information Hlw for the vehicle interior. In this case, the true brightness information Hlw results on the basis of the ambient brightness information HU and the glasses brightness information HB. For example, the true brightness information Hlw for the vehicle interior can result as follows:

$$HB = Hlw*F + HU*(1-F),$$

where F is a firmly predefined factor (in the case of a separate glasses brightness sensor) or a viewing-direction-dependent or pose-dependent factor (when determining the glasses brightness information from the camera image from the data glasses camera 38) which indicates the amount to which the captured glasses brightness information is determined by the ambient brightness. The viewing-direction-dependent or pose-dependent factor can be predefined according to a reference table or the like. The true brightness information relevant to the adjustment of the aperture and/or the exposure time results as:

$$Hlw = (HB - HU(1-F))/F.$$

Alternatively or additionally, an item of brightness information relating to the vehicle interior can be likewise transmitted from the driver assistance system 2 via the communication channel 4, with the result that the aperture and/or the exposure time of the data glasses camera 38 can be adjusted directly on the basis of the transmitted brightness information.

LIST OF REFERENCE SIGNS

1 Display system
2 Driver assistance system
21 Environment capture device (camera)
22 Ambient brightness sensor
23 Interior brightness sensor
3 Data glasses
31 Frame
32 Lenses
33 Earpieces
35 Transparent display surface
36 Display device
37 Pose detection unit
38 Data glasses camera
39 Data glasses brightness sensor
4 Data transmission channel
Hlw True brightness information for the vehicle interior
HU Ambient brightness information
HB Glasses brightness information The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for operating a display system having data glasses in a motor vehicle, the method comprising the steps of:
   transmitting an item of brightness information to the data glasses; and
   adapting one or both of an aperture and an exposure time of a data glasses camera, which is used to detect a pose of the data glasses, based on the transmitted brightness information, wherein
   one or both of the aperture and the exposure time of the data glasses camera are adapted such that structures and features of a vehicle interior are distinguishable.

2. The method as claimed in claim 1, wherein
   the item of brightness information is transmitted to the data glasses from a driver assistance system of the motor vehicle.

3. The method as claimed in claim 1, wherein
   the transmitted brightness information corresponds to an item of brightness information for a vehicle interior which is captured by an interior brightness sensor.

4. The method as claimed in claim 1, wherein
   the transmitted brightness information is determined from a camera image from a camera in the motor vehicle which captures part of a vehicle environment.

5. The method as claimed in claim 4, wherein
   the aperture and the exposure time of the data glasses camera, which is used to detect the pose of the data glasses, are determined based on the transmitted brightness information and an item of brightness information captured with aid of the data glasses.

6. The method as claimed in claim 5, wherein
   the brightness information captured with the aid of the data glasses is determined from a camera image from the data glasses camera or is determined via a brightness sensor on the data glasses.

7. The method as claimed in claim 1, wherein
   the transmitted brightness information is determined from an ambient brightness sensor.

8. The method as claimed in claim 7, wherein
   the aperture and the exposure time of the data glasses camera, which is used to detect the pose of the data glasses, are determined based on the transmitted brightness information and an item of brightness information captured with aid of the data glasses.

9. The method as claimed in claim 8, wherein
   the brightness information captured with the aid of the data glasses is determined from a camera image from the data glasses camera or is determined via a brightness sensor on the data glasses.

10. A pair of data glasses in a motor vehicle, comprising:
    a data glasses camera with an adjustable aperture and/or exposure time;
    a pose detection unit operatively configured to:
       receive one or more items of brightness information;
       adapt an aperture and/or an exposure time of the data glasses camera, which is used to detect a pose of the data glasses, based on the received brightness information.

11. The pair of data glasses as claimed in claim 10, wherein
    the one or more items of brightness information are received from a driver assistance system of the motor vehicle.

12. The pair of data glasses as claimed in claim 10, further comprising:
    a data glasses brightness sensor that provides one of the items of brightness information.

13. A display system, comprising:
    a pair of data glasses as claimed in claim 10; and
    a driver assistance system which is configured to provide the data glasses with said one or more items of brightness information.

14. The display system as claimed in claim 13, wherein
    the driver assistance system comprises an ambient brightness sensor and/or an interior brightness sensor for providing a respective item of brightness information.

15. The display system as claimed in claim 14, wherein
    the ambient brightness sensor is formed by a rain sensor or a brightness sensor of an automatic lighting system of the motor vehicle.

* * * * *